(12) United States Patent
Rein et al.

(10) Patent No.: US 11,615,138 B2
(45) Date of Patent: Mar. 28, 2023

(54) METHOD AND SYSTEM FOR HYBRID AI-BASED SONG VARIANT CONSTRUCTION

(71) Applicant: BELLEVUE INVESTMENTS GMBH & CO. KGAA, Berlin (DE)

(72) Inventors: Dieter Rein, Berlin (DE); Jurgen Jaron, Berlin (DE)

(73) Assignee: Bellevue Investments GmbH & Co. KGaA

( * ) Notice: Subject to any disclaimer, the term of this patent is extended or adjusted under 35 U.S.C. 154(b) by 321 days.

(21) Appl. No.: 17/131,838

(22) Filed: Dec. 23, 2020

(65) Prior Publication Data

US 2021/0109964 A1 Apr. 15, 2021

Related U.S. Application Data

(63) Continuation-in-part of application No. 16/571,395, filed on Sep. 16, 2019.

(60) Provisional application No. 62/731,193, filed on Sep. 14, 2018.

(51) Int. Cl.
*G06F 16/63* (2019.01)
*G06N 20/00* (2019.01)
*G06F 16/61* (2019.01)

(52) U.S. Cl.
CPC .............. *G06F 16/63* (2019.01); *G06F 16/61* (2019.01); *G06N 20/00* (2019.01)

(58) Field of Classification Search
CPC .......... G06F 16/63; G06F 16/61; G06N 20/00
See application file for complete search history.

(56) References Cited

U.S. PATENT DOCUMENTS

| 9,286,876 | B1* | 3/2016 | Dabby | B42D 15/022 |
| 2012/0312145 | A1* | 12/2012 | Kellett | G10H 1/38 84/613 |
| 2013/0086474 | A1* | 4/2013 | Oliver | H03H 3/007 707/E17.058 |
| 2014/0325408 | A1* | 10/2014 | Leppanen | G06F 3/0481 715/765 |
| 2017/0092248 | A1* | 3/2017 | Gozzi | G10H 1/0025 |
| 2019/0197415 | A1* | 6/2019 | Bulut | G06N 20/00 |

FOREIGN PATENT DOCUMENTS

WO WO-2014127063 A1 * 8/2014 ....... G06F 17/30772

OTHER PUBLICATIONS

Budhraja et al., Probability Based Playlist Generation Based on Music Similarity and User Customization, 2012 National Conference on Computing and Communication Systems (NCCCS) (Year: 2012).*

(Continued)

*Primary Examiner* — Jianchun Qin
(74) *Attorney, Agent, or Firm* — Fellers, Snider, Blankenship, Bailey & Tippens; Terry L. Watt

(57) ABSTRACT

According to an embodiment, there is provided a system and method for automatic AI-based song construction based on ideas of a user. It provides and benefits from a combination of expert knowledge resident in an expert engine which contains rules for a musically correct song generation and machine learning in an AI-based audio loop selection engine for the selection of fitting audio loops from a database of audio loops.

7 Claims, 7 Drawing Sheets

(56) References Cited

OTHER PUBLICATIONS

Franco et al., Distance Metrics and Indexing Strategies for a Digital Library of Popular Music, Proceedings of IEEE International Conference on Multimedia and Expo, 2000 (Year: 2000).*

* cited by examiner

METHOD AND SYSTEM FOR HYBRID AI-BASED SONG VARIANT CONSTRUCTION

CROSS REFERENCE TO RELATED APPLICATIONS

This application is a continuation-in-part of co-pending U.S. patent application Ser. No. 16/571,395, filed Sep. 16, 2019, which application claims the benefit of U.S. Provisional Patent Application Ser. No. 62/731,193 filed on Sep. 14, 2018, and incorporates said applications by reference into this document as if fully set out at this point.

TECHNICAL FIELD

This disclosure relates generally to methods of editing and generating audio content and, in more particular, to methods utilizing a combination of collected and stored expert knowledge and machine learning in an artificial intelligence-based ("AI") selection engine for automatic audio song construction.

BACKGROUND

Creation of a musical work has been a goal and dream of many people for as long as music has been around. However, a lack of knowledge of details regarding the intricacies of musical styles has prevented many from writing or generating music. As such, this endeavor has, for a very long time, been the purview of individuals having the necessary knowledge and education.

With the advent of the personal computer and other computerized devices (e.g., tablet computers) and the widespread adoption of these devices in the home consumer market, software products emerged that allowed a user to create original music without the need-to-know music theory or needing to understand the terminology of music constructs such as measures, bars, harmonies, time signatures, key signatures, etc. These software products feature graphical user interfaces that provide users with a visual approach to song and music content creation that allowed the novice user easy access to the tools useful in music generation and enabled the users to focus on the creative process without being hampered by having to learn the intricacies of music generation.

In addition to increasing the accessibility of music generation, the content that is available and usable in the process of generating music has also been adapted to correspond to the directive of supplying an easy to use music generation approach. These sorts of programs typically provide a number of individual sound clips of compatible length, e.g., sound loops or just "loops", which can be selected and inserted into the multiple tracks of an on-screen graphical user interface as part of the process of music creation. With these sorts of software products, the task of music or song generation has come within reach of an expanded audience of users, who happily take advantage of the more simplified approach to music or song generation as compared with note-by-note composition. These software products have evolved over the years, gotten more sophisticated and more specialized and some have even been implemented on mobile devices.

The general approach to music or song generation provided by these software products has remained virtually unchanged, even though the processing power of the computing devices has increased and the types of devices that run this software has expanded on par with the changes in device distribution. That is, the conventional approach to music creation which has remained largely unchanged involves requiring the user to select individual pre-generated audio loops that represent different instruments (e.g., drums, bass, guitar, synthesizer, vocals, etc.), and arrange these loops in digital tracks to generate individual song parts, typically with a length of 4 or 8 measures, the goal being the generation of a full audio clip or song. Using this approach most users are able to generate one or two of these song parts with the help of the graphical user interface of a mobile or desktop-based software product according to their own taste and are therefore potentially able to generate individual verses and maybe the refrain of their own song.

A complete song or a complete musical composition however is normally, for example, at least two minutes long and includes more than only one song part, e.g., up to 16 individual song parts might be used to generate a sonically pleasing composition. To generate so many song parts with the necessary enthusiasm and eye for detail exceeds the patience and endurance of most users and these users often end the creation process in frustration without completing a musical work, obtaining one that is of insufficient length, or obtaining a work that is not musically satisfying. In addition to these problems on the creative and user interface side of the creation process, repeated discontinuation of the creation process of a song or music piece may result in permanent abandonment of the software product itself which is also not desirable either for the user or the provider of the software since completion of the project provides the user with positive feedback in the form of pride in having completed the project which potentially also results in a favorable impression of the software tool used to do that. Additionally, given the prevalence of social media, production of a musically appealing composition can result in approval from a valued online community when the work is posted which, in turn, encourages the undertaking of additional music creation projects.

Thus, what is needed is a system and method that allows a user to complete the song or music generation process and produce a result that is a musically pleasing complete song or music piece. What is also needed is a system and method that provides the user with expert guidance in creating the work, where the guidance is based on collected and evolving expert knowledge and machine learning in a AI-based system for selection and positioning of suitable audio loops consistent with a user's end goal Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for hybrid AI-based song or music piece construction. In one embodiment the algorithm is integrated into a music generation/song construction process and comprises a combination of expert knowledge in an expert engine and the utilization of machine learning processes in an AI-based loop selection and provision engine. The expert engine provides information and support for the user to make sure that the song construction process is musically correct regarding a preferred song structure, wherein the AI engine is directed to suggest and provide proper and fitting audio loops consistent with the user's musical goal.

It should be clear that an approach such as this would be a tremendous aid to the user and would additionally mean an assistance in the development and the creation of professional music pieces/songs, wherein the formerly tedious and often frustrating process of manually generating song parts and filling these song parts with fitting audio loops is simplified and amplified by expert knowledge and machine learning based information. Therefore, this approach delivers functionality to the user of music creation programs which enables a user to continue and complete the music generation process satisfactory or even automate the music generation process completely. Additionally, due to the fact that the provision and selection of available and potentially usable audio loops is based on machine learning information that is selecting content independent from style based limitations, the user is potentially provided with options regarding the audio loop selection that he or she might never have imagined, therewith a music piece/song could potentially benefit extraordinarily from such a style limitation breaking suggestion of audio loops.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

Figure 1:
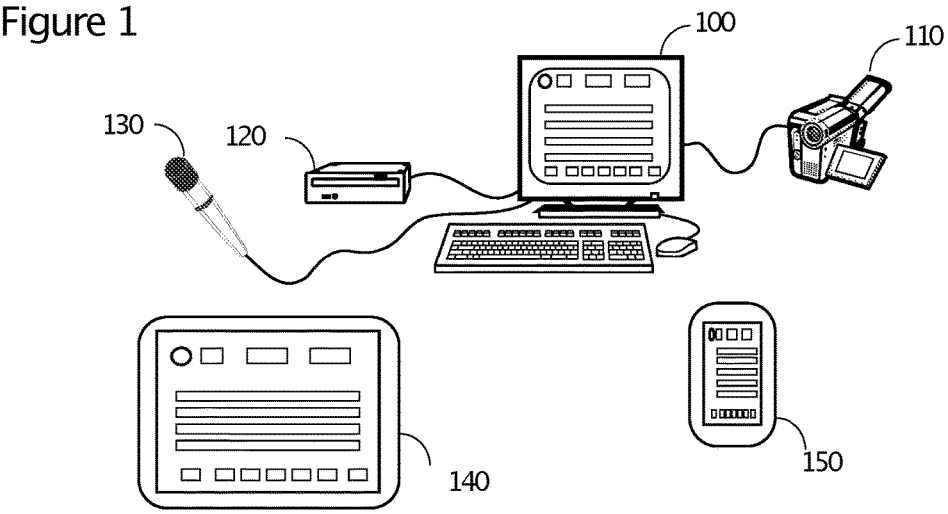
FIG. 1 is an illustration of a working environment of the instant invention according to an embodiment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software running on a user's computer 100 or other device with a CPU such a tablet computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external camera 110 of some sort be utilized with—and will be preferably be connectible to—the computer so that video and/or graphic information can be transferred to and from the computer (FIG. 1). Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally, a microphone 130 might be utilized so that the user can add voice-over narration to a multimedia work and a CD or DVD burner 120 could be useful for storing in-progress or completed works. Further, it might also be possible and is shown in FIG. 1 that the process of the instant invention might be implemented on portable tablet computer devices 140 or on mobile devices, such as smart phones 150.

Figure 2:
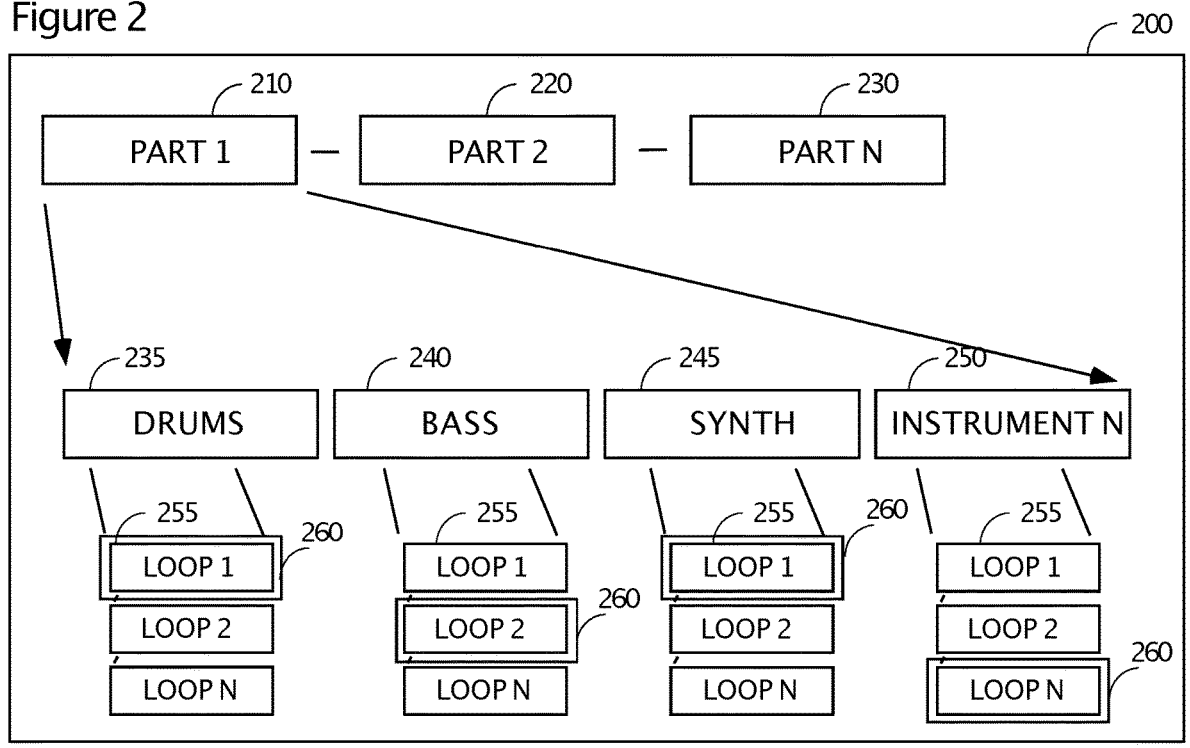
FIG. 2 depicts a general and basic structure of a song or portion of a song according to an embodiment of the instant invention.

Turning next to FIG. 2, this figure illustrates the skeletal structure of a song or a music piece 200 according to an embodiment. This structure functions as the starting point for the functionality of the instant invention. A song or music piece generated by an embodiment of the software product will consist of a plurality of individual song parts which is illustrated by part 1 210 and part 2 220 in FIG. 2, where the denomination of part N 230 is used to show that a potential song or music piece might consist of an arbitrary number of parts. Each part has a specific runtime at a given tempo, which might be selected and defined by the user, alternatively the run time might be strictly defined as being, for example, 4 or 8 measures or multiples thereof. Additionally, these parts might be further specified by, for example, designating them as being an intro or an ending. FIG. 2 also generally indicates that each part of a song or music piece preferably consists of an arbitrary number of instruments, wherein audio loops that sound these instruments are supplied accessible to the user and the AI engine discussed below, an audio loop being a digital section of sound material that usually may be seamlessly repeated, i.e., "looped". Further details with respect to the figure are presented below.

In FIG. 2 the instruments drums 235, bass 240 and synth 245 are depicted, which is not meant to limit the specification of the instant invention to only these instrument variations, on the contrary it should be clear that a plurality of other instrument choices are certainly possible, and the limitation to these three instruments in this figure is only for illustrative purposes. Also instrument N 250 is depicted as being chosen to illustrate this fact, where N stands for an arbitrary number of instruments. For each of the available and potentially selected instruments at least one audio loop 255 at a time is selectable 260 and therewith being replayed during the play time of the particular part. The selection of each audio loop is either carried out by the user manually or automatically by the instant invention.

Figure 3:
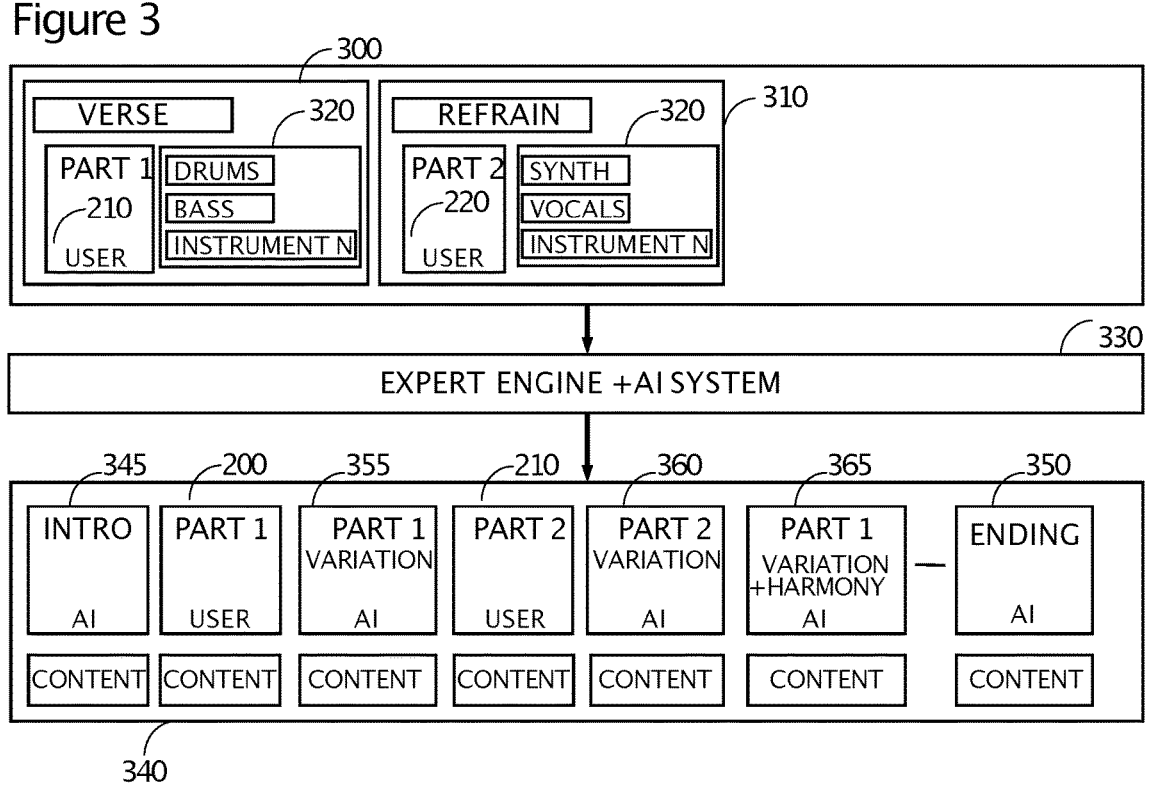
FIG. 3 illustrates a high-level view of the interaction of the parts of an embodiment.

FIG. 3 gives additional details of the process of constructing a skeleton. The structure or skeleton of a song is depicted there. In this example, a song is constructed of 8 individual sections, which might be an intro 345, an ending 350, all of the user supplied sections with their content 200 and 210, and, in this particular example, a mixture of variations of these supplied parts (355, 360 and 365). In addition, parts might be added to the skeleton to lengthen the runtime of the work. So, in this example the skeleton basically includes an intro and an ending and in between the user parts plus variations of these parts and new parts, the variations and new parts preferably being chosen and automatically added by the expert engine. Of course, other song parts might be available including, for example, a song bridge, a song refrain/chorus, pre-chorus, etc.

The AI system uses the skeleton model as a starting point and the skeleton model has the song structure planned, i.e., the Parts, Style, Instruments and so on. To fill in the gaps in the skeleton model the AI system looks at each empty part and its desired content (as specified by the skeleton) and fills it with loops consistent with the requirements of those parts. The AI system has access to all of the loops and information about all the loops in the loops database and their associated auditory properties. The AI system may or may not select a loop from a style that is normally used to, for example, to generate a blues song if "Blues" is the selected style. But, if the AI system determines that the auditory properties of a loop in the database are sonically compatible then it may select that loop for insertion into the skeleton, independent from the style association of that loop.

In one preferred embodiment the selected audio loop is played during the whole runtime of the part to which its parent instrument belongs, however it is also possible that the user may select and de-select or switch individual audio loops during the runtime of the particular part. The instant invention provides and utilizes an evolving and growing database of audio loops, wherein the audio loops are categorized according to one or more particular styles, for example EDM, 50s, Drum'n Bass and House. Each individual style features a plurality of different instruments associated with it and each instrument has a number of associated audio loops, i.e., audio loops in which the instrument sounds when the loop is played (e.g., recorded). Of course, there might be one or multiple instruments recorded in a loop. Also, in some cases, the loop might not contain a traditional audio recording of an acoustic instrument but might contain computer generated sounds that resemble (or not) traditional instruments. Either way, when it is said that an instrument is recorded in a loop that term should be broadly construed to cover instances where there is a digital audio recording of that instrument as well as cases where the audio material in the loop is computer generated. This database will preferably be updated on a regular basis with new styles being added, existing styles being updated or deleted, etc. Preferably these updates will be delivered over the Internet for free or in exchange for a particular payment option.

Talking further about FIG. 3, this figure illustrates the interaction of the participating parts of an embodiment of the instant invention in a compressed form. Preferably in most cases, the instant invention will begin with a fragmented song or music piece, comprised of at least one, and preferably two, selected and defined song parts, usually a verse 300 and a chorus or refrain 310 of a music piece. These song parts are generated and provided with audio content 320 by a user, the content preferably being audio loops selected by the user. This song fragment might be the starting point for the instant invention; alternatively, the starting point might be the selection of a music style, or a seed song from a song library. For each of the different starting points the following steps are the same in this embodiment—the starting data (e.g., loops/variation/style/volume or intensity or dynamic, etc.) is selected by the user and provided to the combination of the expert engine and the AI system 330. This combination will preferably proceed to sequentially process the existing user-defined starting point and as a result provide a complete song 340 for review by the user. Additionally, the user might influence the song creation process by specifying a desired tempo or preferences regarding the dynamics progression of a song (for example—the beginning should be calm—in the middle it is aggressive and at the end energetic).

By way of additional details, in certain embodiments an expert engine will analyze the user defined or selected song parts to identify a preferred style. Based on the style a song length will be chosen by the expert engine that is compatible with that style. That is, the expert engine will contain rules, guidelines, preferences, etc., provided by experts who are familiar with a particular style of musical work, collectively "rules" hereinafter. That being said, it should be understood that these guidelines might (or might not) be strict rules, but instead are more general preferences. The rules that are accessible by the expert engine might include things such as the length of the song, preferential chord change patterns, preferable instruments, preferable tempos, preferable percussion patterns, etc. Thus, the user may, for example, override the suggested song length and choose an alternative length if that is desired. Given the identified or selected style, the following sorts of decisions can be made by the expert engine as part of the music work creation process:

the song skeleton can be generated;

instruments/voices/loops can be selected;

a harmonic progression can be selected;

the dynamics dramaturgy of the musical work can be determined for the musical work that is to be created;

the range of variation that is permitted in the selected loops for that style can be established, e.g., how many loops can be changed and how different from the loops already in use a newly selected loop can be, etc. (i.e., a "variance setting" hereinafter, described in greater detail below below).

To better understand the capabilities of the expert system, it may be useful to understand how an embodiment is constructed. The expert system is a conglomerate of information gathered from music experts who were asked to provide information about how a particular song in a selected style should be built within the confines of a loop-based music generation system. So, this is like a curated system that is constantly updated and a living/ constantly updated system which is incremented from constant new additions or changes to the contents of the expert system.

With respect to the AI system, this system has access to a loops database, with each loop being associated with one or more different compatible music styles and being sorted into specific packs, so called loop packs (e.g., African, Arabic, Asian, blues, country, electric, folk, hip hop, jazz, Latin, pop, R&B/soul, rock, classical, etc.). The AI is trained with all the loops independent of the styles, meaning that the AI system also has access to the loops, their auditory properties (calm/aggressive, singer, no singer, female singer etc.), their lengths, tempos, dynamics and key and the associated instrument and style.

The AI system uses the skeleton model as a starting point and the skeleton model has the song structure planned, i.e., Parts, Style, Instruments and so on. To fill in the gaps of the skeleton model the AI system looks at each part and its desired content and fills it, even if the style of the loop is different from the requested style. So, the AI system need not use the designated style in selecting loops. That is one thing that is unique about this embodiment—there are no style boundaries with the AI system. This is because the AI system, although it might have access to all loops in the database and their associated auditory properties including a style and loop pack, can use other information to select a loop that might be from a style that is not normally used with the designated song style. If the style is "blues" and the AI system identifies a loop from a different style that is compatible, that loop might still be selected and inserted into the skeleton.

The loop selection process is based on the auditory properties and particular characteristics of the song skeleton and the instrument type. So, for example, a loop might be stored in the database of the AI together with a number of performance-related parameters values such as its length (in beats, measures, run time, etc.), a preferred tempo, its timbre, a measure of its harmonic compatibility (e.g., is it in major or minor key, are there particular styles that it is incompatible with, can it be transposed without loss of quality to the current key, etc.), rhythmic information (e.g., is it syncopated, straight time, —properties of music). These values are stored for each loop in a database and the AI utilizes some or all of these performance parameters when selecting new loops. When an embodiment of the instant AI system is instructed to fill in a song skeleton, it will first look at the user-supplied loops (provided by the user in the parts, e.g., parts 200 and 210). It will also determine the instruments associated with each loop, i.e., which instruments each loop expresses. The AI will analyze the music parameters and select loops for insertion for which the values (in view of all music properties) are within a defined threshold and belong to a particular instrument. It may be clear now that the type of skeleton does not necessarily control the loop selection process to any great extent. The loop selection process is more focused on the previously selected user-chosen loops. However, the type of instruments associated with the skeleton also contributes to the loop selection process.

The completed song preferably consists of a proper intro section 345 and ending section 350, any pre-existing user generated song parts 210, 220 and a plurality of additional song parts that have been generated according to structural requirements defined by the expert engine and filled with appropriate content provided and proposed by the AI system, so, for example, the AI system may select different audio loops for the vocal instrument selected in original part 2 220 and the expert engine may determine it structurally inconsistent to have different audio loops in the vocals instrument and may delete the vocal instrument completely, thereby generating a variation 360 of original Part 2.

Instead of changing or deleting specific audio loops from the different parts and instruments other options are also available for the generation of variations of the selected parts, for example the expert system may change the harmony of the part, the bpm (beats per minute) of the song part, create a harmonic progression for the selected part, change the intensity of effects over the running time of the selected part—all these options resulting in a variation of an original part. The instant invention additionally provides a global setting for the variance whose spectrum might be definable by the user and which ensures that for each iteration of the instant invention different but still fitting audio loops are selected and inserted. With this variance setting the system will preferably be able to generate many different variants of a song or music piece in a very short amount of time, wherein all these variants are based on the initial song ideas from the user. Additionally, to the global setting for the variance it might also be possible that the variance setting might be applied to individual song parts only.

As an example, suppose song No. 1 has part 1 with three instruments and in each instrument one loop, with part 1 having been constructed by the user. The AI system knows the auditory properties of these three loops and if the variance level is low the AI system in its selection of new loops for part 2 in the skeleton model only selects audio loops for the instruments whose auditory properties are very similar (tempo in part 1 instrument 1 loop 1 is 78—so the loop for part 2 instrument 1 is selected to have a tempo ±2 (76 or 80) bpm). If the variance level is high this threshold area widens, e.g., it might widen with each step in the variance level ±4.

According to another example, a variation in the loop selection process might be introduced by adding a random amount to each value that is used in the selection of a new loop. That is, in some embodiments a parameter that represents "calmness" might be provided for each loop. This parameter might represent, e.g., the amount of dynamic variation in that loop. Assume for purposes of discussion that the value of an initial existing loop is 0.60. If, for example, the randomization amount is set to 5%, when the AI system searches for loops to include in the skeleton, the search might be broadened to include loops with calmness values between 0.57 and 0.63 and, in some embodiments, values at the extremes might be preferentially selected, with the selection among multiple qualifying loops preferably being random in some embodiments.

In other embodiments, the user might be provided with a graphical user interface that shows, e.g., the ten most prominent parameters of either each loop or the whole generated song. This GUI could also provide a control that allows the user to prioritize each parameter, with the prioritization ranging from 100% to 0%, with 0% meaning that a parameter is never considered and 100% meaning the parameter is the most important, perhaps sole, parameter considered. By manipulating the individual controls for each parameter the user will be able to instruct the AI system, e.g., to select more loops with a female singing voice (control to 100%) and completely ignore loops with aggressive mood (control to 0%). A setting of 50% for the parameter style could instruct the AI system to "mix" it up regarding the loop selection, i.e., the designated parameter is somewhat important, but the AI is permitted to stray from the base style determination set by the skeleton model.

Figure 4:
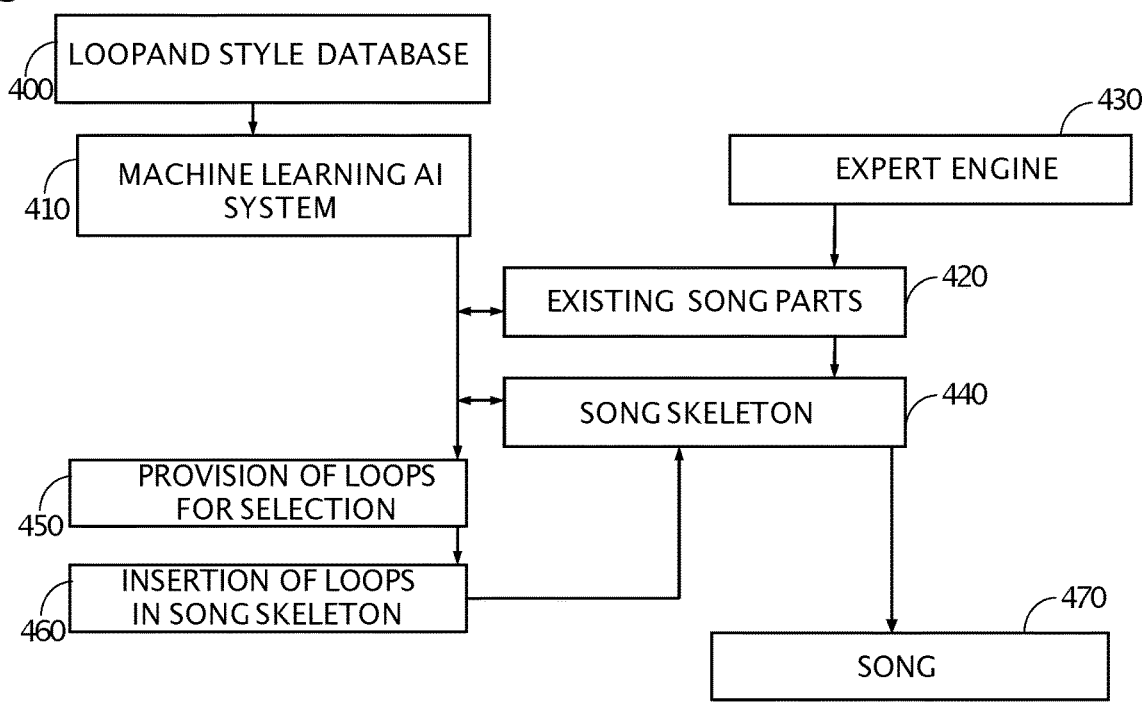
FIG. 4 depicts the functionality of the machine learning AI utilized in a variation of the instant invention.

Turning next to FIG. 4, this figure is depicting an embodiment that illustrates the functionality of the machine learning AI system 410. The system for machine-based learning is constantly being trained with the complete available database of styles and the associated audio loops 400. Constantly meaning that, as has been disclosed, the loop and style availability changes over time, with new content being added to the database and content base or removed from it with the AI constantly evaluating these changes. The AI has complete knowledge of every audio loop, its auditory properties, length, tempo, dynamic and key. Additionally, the AI does know which audio loops are available locally for the user and which have to be purchased online.

Based on the song skeleton 440 generated by the expert engine 430 which utilizes any user provided existing song parts and their associated audio loops 420—and based on the information of the selected loops in the existing song parts 420 the AI selects suitable audio loops from the database for the expert engine generated song parts making up the song skeleton and automatically fills 460 the available data structures of the generated song skeleton 440 resulting in a completed song 470. In another embodiment the AI provides the determined audio loops for selection by the user 450, therewith providing more experienced users the ability to take on a more active part in the song generation process by manually deciding which audio loops to insert 460 into the song skeleton 440. The audio loop selection of the AI system is not bound by the initial style selection of the user from any existing song parts, which results in a much bigger selection horizon compared to the manual selection of audio loops by the user. The utilization of the AI disrupts the predefined "only audio loops from the selected style" selection form music generation in an innovative, efficient and time saving manner.

The selection of suitable audio loops is realized utilizing all the known data from any available initial song parts. That information being the existence of, in one embodiment, at least one song part that comprises of a length of 4 to 8 measures. Each of the potential song parts has instruments (for example drums, bass, guitar, synthesizer, vocals) selected and for each instrument at least one selected audio loop. Each audio loop is stored in a database that additionally stores its individual auditory properties as well as its association to an instrument and style. The AI system initially determines the instruments from any existing song parts and determines compatible and usable instruments in a next step—this is realized by an ad hoc judgment regarding the usability of different new audio loops from individual instruments with respect to the already inserted and selected instruments and audio loops. This ad hoc judgment provides a determination above a specific threshold level which instrument and audio loop is acceptable in the specific song part of the generated song skeleton. In a next step the different and new audio loops are selected, provided to the user and ultimately inserted into the generated song skeleton, this being carried out either automatically or upon user approval.

Figure 5:
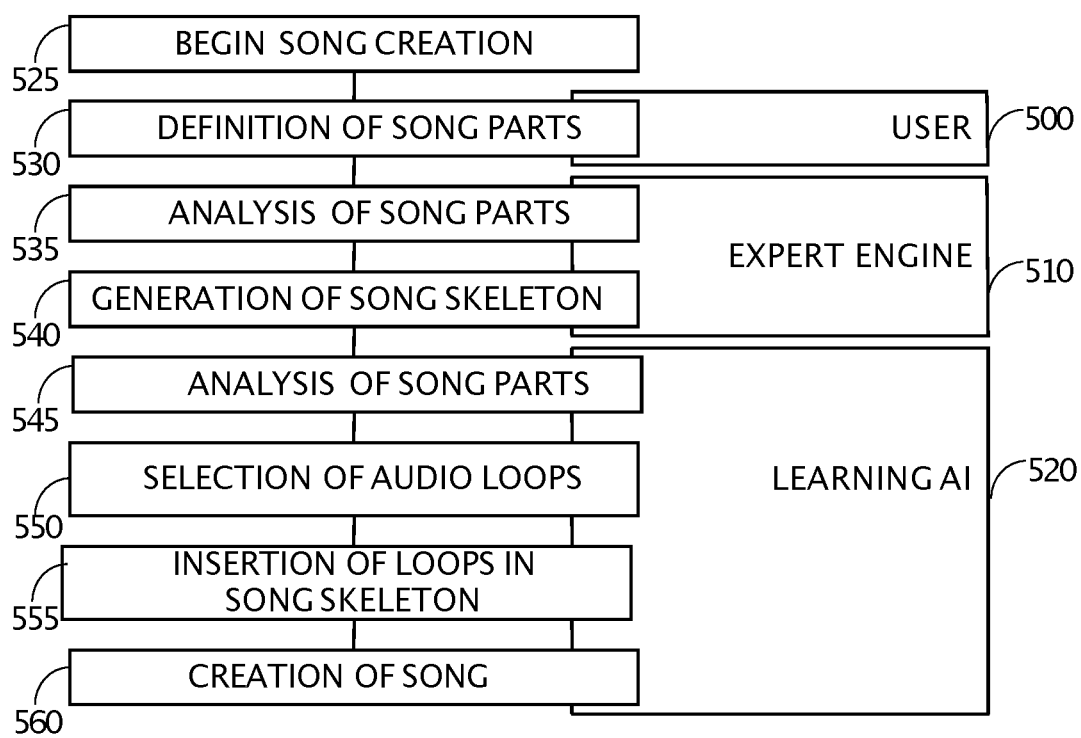
FIG. 5 is an illustration of a compressed form of the workflow of an embodiment of the instant invention.

Coming next to FIG. 5, this figure is an illustration of one preferred workflow of the instant invention. As a first preferred step the user 500 initiates the song creation or generation process 525 from within a software program used for this purpose. In a next preferred step, the user 500 begins the manual creation of a song or music piece by defining individual song parts (at least one) 530 and providing these song parts with style selection, instrument selection and audio loop selection. In a next preferred step, either automatically or depending on activation by the user, the expert engine 510 begins the analysis of any already generated song parts 535 and as a result of that analysis generates a song skeleton 540, representing a full song consisting of a plurality of individual song parts.

Continuing in more detail, the song skeleton generation process is initiated by the expert engine by determining the user selected style or styles from any previously song parts or any of the information provided by the user. Depending on the determination of the style the expert engine makes the following sorts of choices—it should be understood that these choices do not need to be carried out sequentially, it might also be possible that the expert engine could be configured to process the mentioned points in a different order. In one embodiment, the expert engine determines a suitable length of the target song; this might depend, for example, on the initially selected style. For example, a 12-bar blues will typically have a verse that is 12 measures long, e.g., in the key of C the progression would be C-C-C-C-F-F-C-C-G-F-C-C.

Next, according to an embodiment, the expert engine determines the song scheme or song skeleton—for example, "Intro-Verse 1-Verse 1 Variation-Refrain 1-Verse 2-Verse 2 Variation-Refrain 2-Verse 3-Verse 3 Variation-Refrain 3-Ending". Then pluralities of different instruments are selected, where these instruments are selected to be compatible with the selected style. The expert engine also determines harmony sequences that are typical for the selected initial style—for example for a blues style a chord change pattern of C-C-F-F-C-G-F-C (in the key of C) would be a fitting harmony or chord sequence, where the letters represent chords in one variation of a traditional 8-bar blues.

Of course, there are a number of variations of, in this example, the 8-bar blues and the expert engine would be free to choose among them. One way to do this might be to choose a skeleton randomly from among those available. As another example, a familiar rock chord progression (in the key of G) might be G-D-E-C-G. Also, the dynamics structure for the song skeleton will be determined where, for example, the dynamics will be being defined as having a step wise increase from the beginning to the end of the song, e.g., the song would tend to get louder. The expert engine also could specify the level of the variation for each to be created song part, for example a definition of how many of the audio loops in each song part could be exchanged and how much the audio loops will be allowed to differ from the audio loops selected by the user.

The data that is utilized as the basis for the expert engine is gathered from a data foundation collected from experienced song producers, wherein for each individual style a specific data set is created and stored in a database (preferably xml-based). The data will be constantly under review by these experts and will preferably be updated and varied at any time.

In a next preferred step, the machine-based learning AI 520 is taking into account the data from the expert engine, the generated song skeleton 540 and any user created song parts 545 or any other information given by the user and begins with the selection of audio loops 550 and inserts these audio loops into the song skeleton 550 therewith creating the song 560.

After the song has been created utilizing the above listed steps and processes the user might have the desire to generate a plurality of different variants of the created song, wherein these variants are preferably generated with the resulting variants stemming exclusively from an approach differentiating the utilized audio loops from the loop database.

The variant generation is preferably started with a song that is acceptable to the user and has been generated with either the disclosed mixture of the AI system and the expert knowledge or with a song that has been generated by the user. A user might have the desire to generate variants of this particular song, because individual used loops in the song are not liked by the user or more (of the same) music is needed by the user to, for example, set the music for a movie.

Generally, there is only a limited supply of audio loops in the selected style for each instrument, for example 10 audio loops for drums instrument, 15 for guitar instrument and 5 for bass. In this particular embodiment of the instant invention, the goal is to generate as many variants of an acceptable/good song as possible. Generally speaking, a number of different variants might be required to accommodate different user preferences.

If only a small number of variants are desired and if that number does not exceed the number of available audio loops per instrument a nearest neighbor algorithm will preferably be initiated, starting with the structural layout of the generated song. The instant invention iterates through each of the selected existing loops of the generated song and for each existing, previously selected audio loop a nearest neighbor algorithm is initiated and for each audio loop an audio loop from the instrument that is tonally most similar to the existing audio loop is selected. The existing loops from the generated song are replaced by the audio loops selected with the run-through of the nearest neighbor algorithm and at least a first variant song with the same skeletal structure and length as the original song is generated, however this song inhibits a different, yet somewhat similar sound—because different audio loops from each instrument make up this particular variant song.

In case that the desired number of variants exceeds the number of available audio loops per instrument the instant invention does not initiate the nearest neighbor algorithm, instead the instant invention randomly selects an alternative audio loop for each existing audio loop from that particular instrument the existing audio loop is associated with and inserts the selected alternative audio loop into the skeletal structure of the existing song.

Therewith the instant invention will generate an arbitrary number of song variants, which will each sound differently because of the high combinatorics of the randomly selected audio loops.

Figure 6:
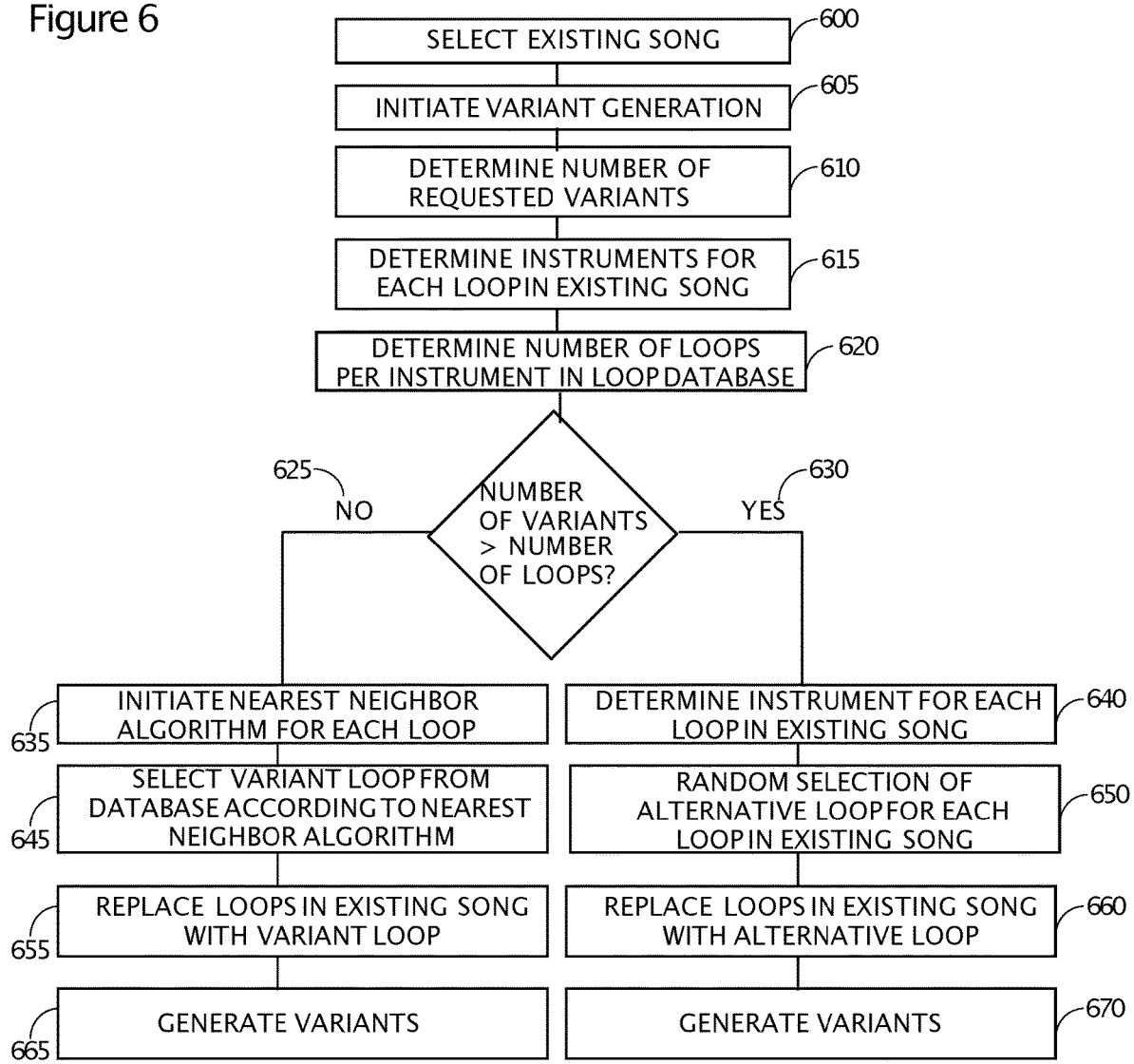
FIG. 6 illustrates a workflow of the instant invention of the variant generation process.

FIG. 6 depicts one preferred approach to generating a specific number of variants of an existing song according to the instant invention. In a first preferred step the user selects the existing song from which he or she wants to generate variants 600. As a next preferred step, the user initiates the variant generation process 605, wherein the user is asked to specify the requested number of song variants in a next preferred step 610. The instant invention will then determine the type of instruments of each audio loop in the existing song 615 and in a further step the instant invention will determine the number of audio loops for each instrument in the selected audio loop pack of the audio loop database 620.

In the event that the number of requested variants is lower than the number of audio loops per instrument 625 the instant invention will initiate a nearest neighbor algorithm for each audio loop of the existing song 635 and will compare the data value representing this audio loop with the data values of the audio loops stored in the audio loop database. The nearest neighbor according to this comparison is selected 645 and inserted into the existing song in place of the existing audio loop thereby replacing it 655. The step of initiating the nearest neighbor algorithm together with the selection of an alternative (nearest neighbor) audio loop from the audio loop database and inserting the alternative audio loop into the existing song is executed for each audio loop in the existing song so that, at the end, each existing audio loop is replaced with an alternative (nearest neighbor) audio loop thereby generating the desired number of alternative songs. To arrive at the desired number of variants 665 without generating variants that are too similar to each other this embodiment performs the variant generation process multiple times, with each new generated song variant being selected as the "existing" song for whose audio loops the nearest neighbor audio loops are determined and selected.

In case that the number of requested variants is higher than the number of audio loops per instrument 630 the algorithm will determine the instrument for each audio loop in the existing song 640 and in the next preferred step the instant invention will randomly select an alternative audio loop according to the instrument of the existing audio 650 and will replace the existing audio loop with that selected alternative audio loop 660 repeating this step a plurality of times to therewith generate the desired number of variants 670. In some embodiments, the alternative/replacement loop will be chosen from loops that are identified as containing instruments of the same type as the loop that is being replaced. The loops might also be further limited to those loops in the same style (e.g., jazz, rock, etc.). However, it will generally be preferable to just select a replacement loop via a random selection from all loops in the database associated with the same type of instrument.

Figure 7:
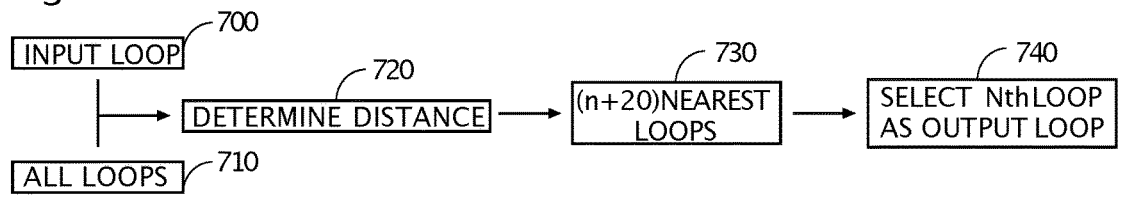
FIG. 7 depicts a flowchart of an approach of variant generation by utilizing nearest neighbor selection.

Turning next to FIG. 7, a variant generation approach according to the nearest neighbor algorithm is depicted. This figure and the following figures depict a number of approaches to generating song variants with a high variability on the level of audio loop selection. The input loop 700 and all audio loops 710 and the data values representing these audio loops are available to the instant invention and the variant generation algorithm. In a next preferred step the instant invention will determine the distance 720 between the data values of the input loop and all audio loops from the database, preferably by utilizing a nearest neighbor algorithm, and using that distance determination the instant invention will select and more specifically determine an arbitrary number of nearest audio loops—nearest audio loops to the input loop 730 wherein in the last step the instant invention will select one of these determined audio loops as the output/replacement loop for the input loop 740. It should be noted that the notation "n+20" is just given as an indication that there could be a designated number of loops (possibly more or fewer than 20) available to select based on their calculated distances. This might be a predetermined number of loops, e.g., the 20 closest loops are identified. In other cases, the number of loops that are available might be based on a distance threshold, e.g., all of the loops that have distances less than a previously selected value would be identified. Those of ordinary skill in the art will be readily able to incorporate other approaches of providing suitable loops.

Figure 8:
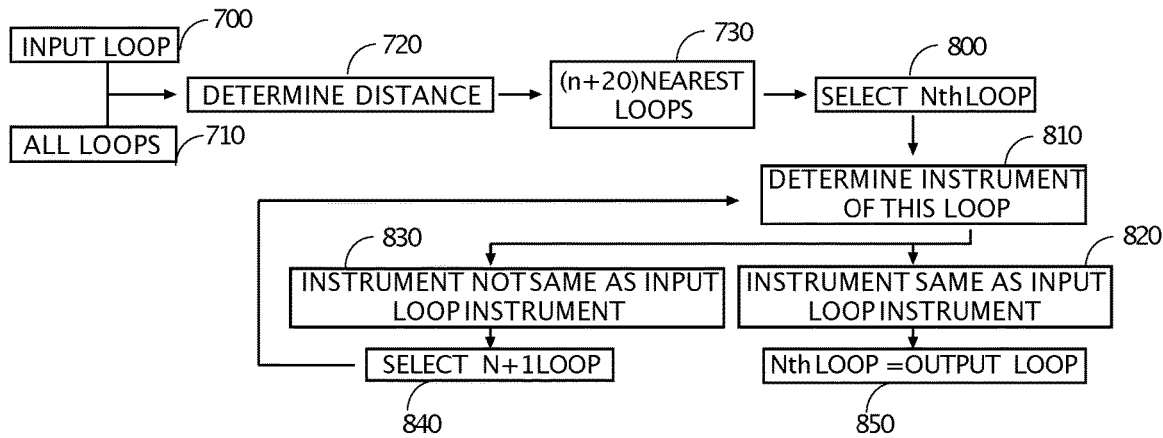
FIG. 8 illustrates a flowchart of an approach of variant generation by utilizing the instrument type.

Coming next to FIG. 8, this figure illustrates the variant generation of the instant invention wherein the instrument association of the input loop is of high relevance. That is, an output loop will be restricted to being the same instrument type as the input loop. Note that this term should be broadly construed when it is used herein in that the instrument type could be the name of the single instrument in the clip or a designation like orchestra, horn section, string section, etc. The first part of the process is the same as that which is described in connection with FIG. 7 wherein the data values of the input loop 700 of the existing song are selected along with the data values of all the audio loops 710 stored in the database. The distance between the data values of the input loop and those of the audio loops stored in the database are determined 720 with an arbitrary number of nearest loops being determined 730 as result of that distance determination. In a next preferred step one loop from these determined nearest loops is being selected for further processing 800, which in the next step is the determination of the instrument type associated with the selected nearest loop 810. In case that the instrument type is the same as the instrument type of the input loop 820 the selected nearest loop is being utilized as the output/replacement loop 850. In case the instrument type is not the same as the instrument type of the input loop 830 the instant invention will select a next nearest loop from the pool of determined nearest loops 840, for which in the next step the instrument type is being determined re-starting the processing loop.

Figure 9:
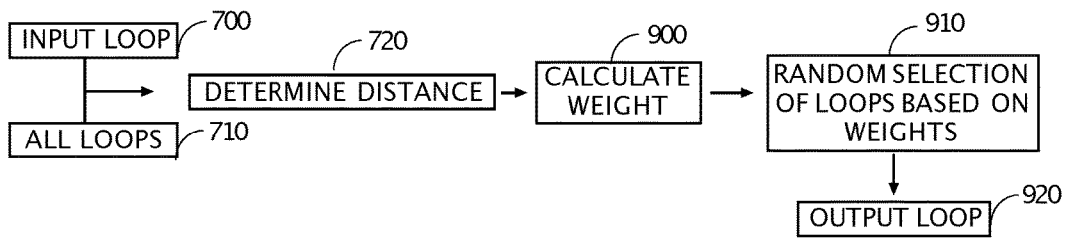
FIG. 9 is an illustration of a flowchart of an approach of variant generation by weighting available audio loops.

Coming next to FIG. 9, this figure illustrates an alternative audio loop selection of the instant invention utilizing a weighting step and random selection of alternative/replacement loops according to the determined weights. For each input loop 700 and all loops of the database 710 the data values are selected to determine the distance between the input loop and all loops of the audio database utilizing a nearest neighbor algorithm 720. In the next step all loops are weighted inversely according to their distance values 900. One acceptable weighting would be log(1/distances). In the next step a random loop selection is initiated based on the determined weights 910 providing an output/replacement loop 920.

Figure 10:
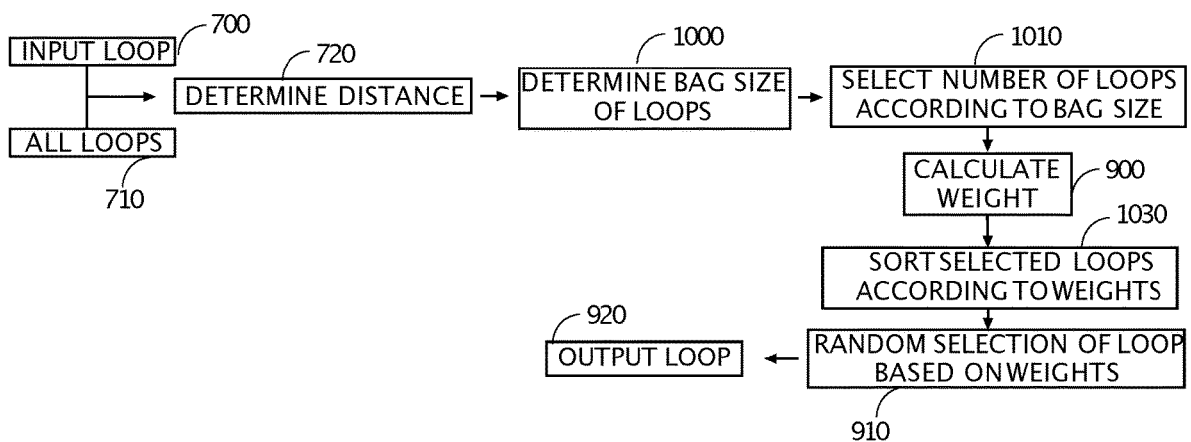
FIG. 10 depicts a flowchart of an approach of variant generation by limiting the number of selectable audio loops.

FIG. 10 depicts the output loop selection process for this embodiment which incorporates random loop selection. For each input loop 700 and all loops of the database 710 the data values are selected to determine the distance between the input loop and all loops of the audio database utilizing a nearest neighbor algorithm 720. In the next preferred step, a bag size determining the total number of alternative audio loops from which the instant invention will select the output loop will be set 1000. Note that the term "bag" refers to an identified subset of the loops. In the next preferred step, the instant invention will "fill" the bag with audio loops according to the set size 1010 with the distance determination step utilizing the nearest neighbor algorithm determining the individual audio loops. The determined audio loops are then weighted according to the distance value 900 with the loops being sorted according to the weight values 1030 in the next preferred step. In the next step a random loop selection is initiated based on the determined weights 910 providing an output/replacement loop 920. In some embodiments, the probability of a loop's selection will be inversely proportional to its distance value.

Figure 11:
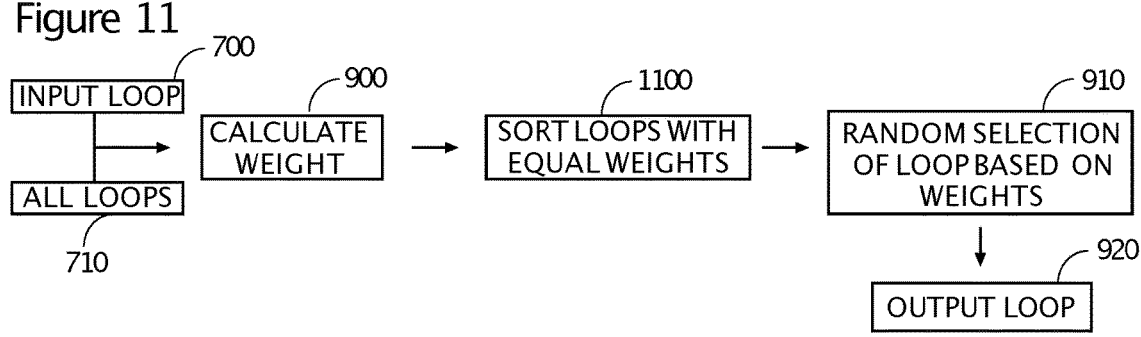
FIG. 11 illustrates a flowchart of an approach of variant generation by utilizing a weighting and sorting mechanism.

FIG. 11 depicts an approach where the weighting process of the audio loops and the initial input loop is not initiated and instead a random loop selection is disclosed. For each input loop 700 and all of the loops of the database 710 the data values are selected and provided to a weighting step 900 that is not initiated, resulting in all audio loops with equal weights (e.g., equal probabilities), wherein the audio loops 1100 are stored in a collection. In a next preferred step, the instant invention randomly selects an output loop 910 from that collection providing an output/replacement loop for each individual input loop 920.

Figure 12:
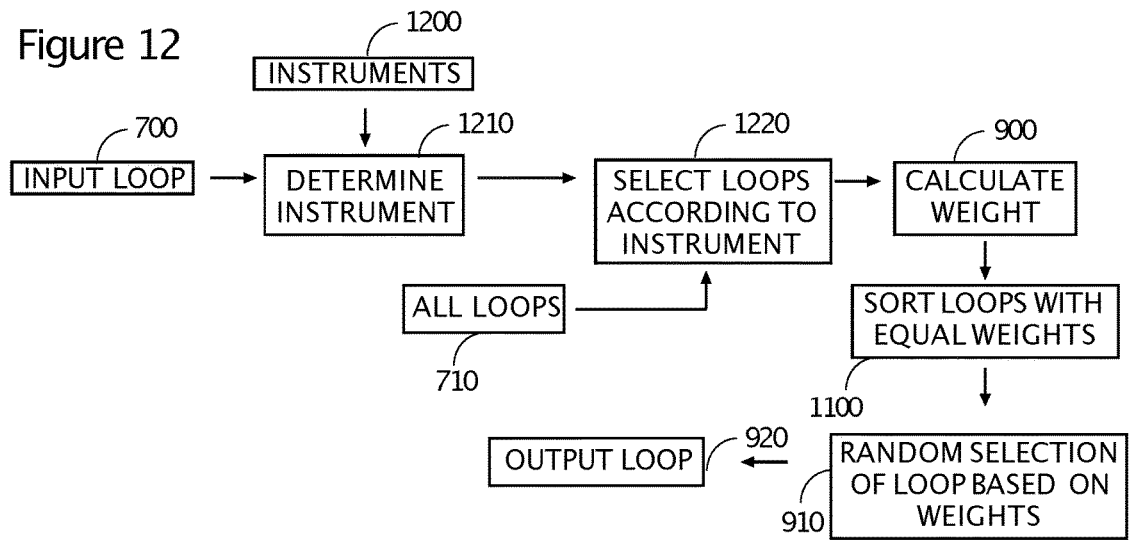
FIG. 12 illustrates a flowchart of an approach of variant generation by utilizing the instrument type of the input loop.

Turning next to FIG. 12, this figure illustrates another embodiment of the instant invention wherein the instrument type of the input loop is the essential factor for the selection of the output/replacement loop. For the input loop 700 and the list of instruments 1200 the instrument type of the input loop 1210 is determined. In a next preferred step, the instrument type is utilized to select audio loops according to the determined instrument type 1220 from all audio loops 710. In the next preferred step, the selected loops are then provided to a weighting determination process to calculate a weight for each selected audio loop 900 with the loops having equal weights 1100 sorted into a collection. In a next preferred step, the instant invention randomly selects an output loop based on the determined weights 910 and the instrument type providing an output/replacement loop for each individual input loop 920.

Figure 13:
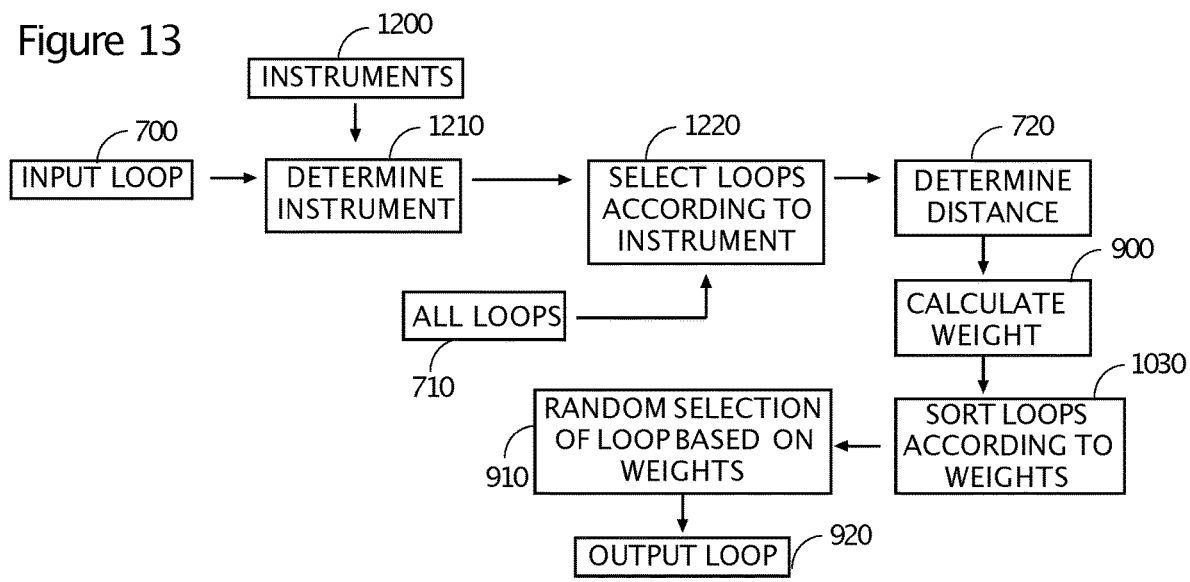
FIG. 13 illustrates a flowchart of an approach of variant generation by utilizing instrument type, near distance determination and weighting in loop determination.

Coming next to FIG. 13, this figure illustrates the previously disclosed approach of instrument type-based selection of output/replacement loops with the nearest neighbor algorithm as an additional selection criteria. For the input loop 700 and the list of instruments 1200 the instrument type of the input loop 1210 is determined. In a next preferred step, the instrument type is utilized to select audio loops according to the determined instrument type 1220 from all audio loops 710. In the next preferred step, the nearest neighbor algorithm 720 is implemented on the data values of the input loop 700 and the selected loops according to the instrument 1220 with the so selected audio loops provided to a weighting determination process to calculate a weight for all selected audio loops 900 with the loops being sorted into a collection 1030. In a next preferred step, the instant invention randomly selects an output based on the determined weights 910 providing an output/replacement loop for each individual input loop 920.

Figure 14:
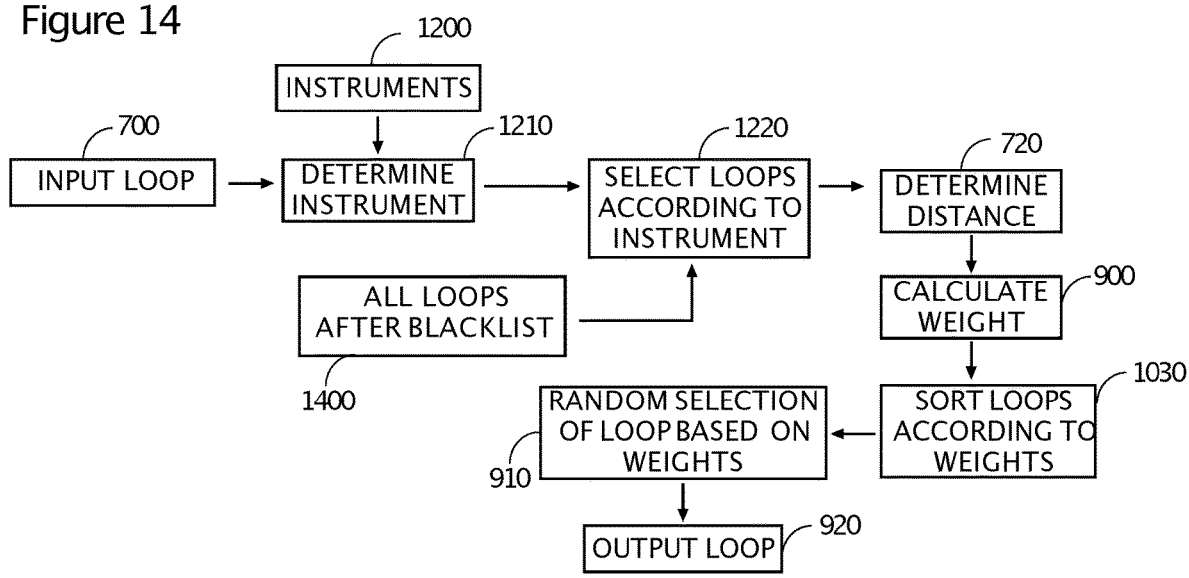
FIG. 14 illustrates a flowchart of an approach of variant generation by utilizing a blacklist feature limiting the available input loops.

Turning now to FIG. 14, this figure illustrates an embodiment of the variant generation of the instant invention wherein a blacklist or exclusion function is integrated into the selection of the loops from the loop database. For the input loop 700 and the list of instruments 1200 the instrument type of the input loop 1210 is determined. In a next preferred step, the instrument type is utilized to select audio loops according to the determined instrument type 1220 from all audio loops after applying an exclusion function 1400. The exclusion function is implemented to exclude audio loops from the available pool of alternative loops. This exclusion is directed to remove loops from the selection pool that are flagged as not usable as replacement loops. This flag could be set manually by a curated system of utilizing expert knowledge. It also could be available as an option for the user which is stored in the system along with the loop. In other embodiments it might be possible to utilize an automatic algorithm-based approach to determine and define loops as not usable and therewith generate an exclusion list. This automatic approach might exclude loops because of insufficient content or because of a distance value that is above a specific threshold value for example. In the next preferred step, the nearest neighbor algorithm 720 is implemented on the data values of the input loop 700 and the selected loops according to the instrument 1220 with the so selected audio loops provided to a weighting determination process to calculate a weight for all selected audio loops 900 with the loops being sorted into a collection 1030. In a next preferred step, the instant invention randomly selects an output loop based on the determined weights 910 providing an output/replacement loop for each individual input loop 920.

Figure 15:
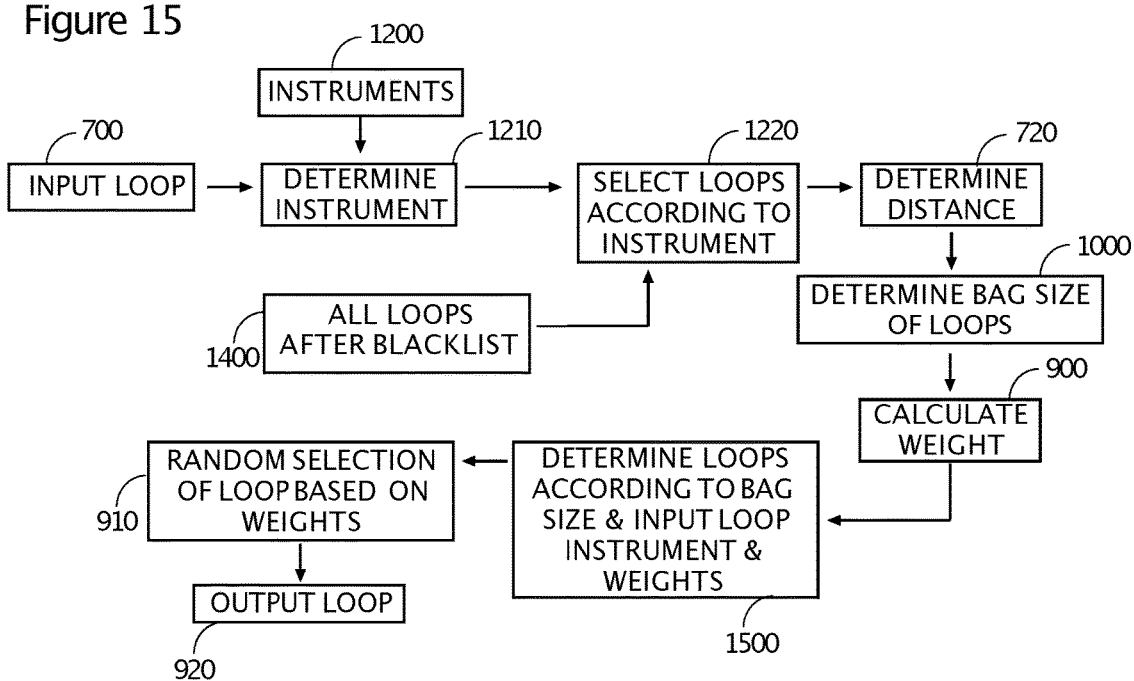
FIG. 15 depicts a flowchart of an approach of variant generation by combining a plurality of limiting features for selection of replacement loops.

Coming next to FIG. 15, this figure depicts an approach of the instant invention wherein the number of randomly selected replacement loops is further limited by introducing a specific bag size parameter, where the term "bag" represents an identified subset of the available loops. For the input loop 700 and the list of instruments 1200 the instrument type of the input loop 1210 is determined. In a next preferred step, the instrument type is utilized to select audio loops according to the determined instrument type 1220 from all audio loops after applying an exclusion function 1400. The exclusion function provides for the exclusion of certain audio loops from the available pool of alternative loops. This exclusion is directed to remove loops from the selection pool that are flagged as not usable as replacement loops. This flag can be set manually by a curated system of utilizing expert knowledge and a potential flag definition option for the user, wherein this flag definition is then stored cumulatively in the system. In other embodiments it might be possible to utilize an algorithm to determine and define loops as not usable and therewith generate an exclusion list. In the next preferred step, the nearest neighbor algorithm 720 is implemented on the data values of the input loop 700, wherein in a next step a bag size limiting the availability of selectable loops is determined 1000. The so selected audio loops are in a next step provided to a weighting determination process to calculate a weight for all selected audio loops 900 with the loops being determined and sorted according to the following parameter, the bag size, input loops instrument and weights 1500. In a next preferred step, the instant invention randomly selects an output loop based on the determined weights 910 providing an output/replacement loop for each individual input loop 920.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

CONCLUSIONS

Of course, many modifications and extensions could be made to the instant invention by those of ordinary skill in the art. For example, in one preferred embodiment an experienced user might be provided with an elaborate graphical user interface allowing the user to define specific parameter regarding the song creation. So for example a graphical user interface might be provided that allows the user to define the length of the desired song, a specific value determining the variance of the song—meaning defining how diversified the song should be and how much the song is allowed to differ from the original ideas of the user.

Additionally it might be possible for the user to control the style selection—defining which styles are usable by the AI and which are off limits—with a strict limitation option as well as a variable option, wherein the strict limitation defines desired and non-desired styles and the variable limitation is depending on the variance setting. Furthermore, the user might be allowed to influence the harmony setting, defining which keys the song should be using. Also, a determination of the dynamic scheme might be possible, allowing the user to define a dynamic curve for the song.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of song generation, wherein is provided a loop database comprised of a plurality of loops, each of said plurality of loops being associated with at least one instrument type and each of said plurality of loops being associated with a plurality of performance parameters, comprising the steps of:
   (a) requiring a user to select a music work comprised of a plurality of music loops;
   (b) requiring a user to specify a number of music work variants;
   (c) forming a replacement music work from said selected music work t for each of said plurality of music loops comprising said selected music work performing the steps of:
      (1) selecting a target music loop from among said plurality of music loops;
      (2) determining an instrument type of said target music loop;
      (3) identifying one or more loops in said loop database having a same instrument type as said selected target music loop;
      (4) determining a number of identified loops in said loop database having a same instrument type as said selected target music loop;
      (5) when said number of music work variants is greater than or equal to said number of identified loops, randomly selecting one of said identified loops, thereby selecting a replacement loop;
      (6) when said number of music work variants is less than said number of identified loops,
         (i) using one or more of said performance parameters to determine a distance from said target music loop to each of said identified loops;
         (ii) using said determined distance from said target music loop to each of said identified loops to select one of said identified loops having a minimum distance from said target music loop, thereby selecting said replacement loop;
      (7) replacing said target music loop in said selected music work with said replacement loop
      (8) continuing to perform steps (1) through (7) until each of said music loops has been selected as said target music loop;
   (d) after each music loop in said selected music work has been replaced, storing said replacement music work;
   (e) performing steps (c) and (d) with said replacement music work substituted for said selected music work; and
   (f) performing steps (c) through (e) until a number of replacement works that have been stored is at least equal to said specified number of music work variants.

2. The method according to claim 1, wherein step (6)(i) comprises the step of using a nearest neighbor algorithm and one or more of said performance parameters to determine a distance from said target music loop to each of said identified loops.

3. The method according to claim 1, wherein is provided a weighting function, and wherein step (6)(ii) comprises the steps of applying said weight function to said determined distance and determining that said replacement loop is one of said identified loops having a minimum weighted distance from said target music loop.

4. The method according to claim 3, wherein said audio loop database is filtered according to an exclusion list prior to audio loop selection in order to remove selected ones of said audio loop database before performing the step of selecting a target music loop from among said plurality of music loops.

5. The method according to claim 4, wherein said exclusion list is generated by human interaction or alternatively algorithmic interaction.

6. The method according to claim 5, wherein said exclusion list is generated by algorithmic interaction based on the performance parameters of each audio loop.

7. A method of song generation, wherein is provided a loop database comprised of a plurality of loops, each of said plurality of loops being associated with a plurality of performance parameters, comprising the steps of:
   (a) requiring a user to select a music work comprised of a plurality of music loops;
   (b) requiring a user to specify a number of music work variants;
   (c) forming a replacement music work from said selected music work by performing for each of said plurality of music loops comprising said selected music work the steps of:
      (1) selecting a target music loop from among said plurality of music loops;

(2) using one or more of said performance parameters to determine a distance from said target music loop to each of said plurality of loops in said loop database;

(3) determining a replacement loop as one of said plurality of loops in said loop database having a minimum distance from said target music loop;

(4) replacing said target music loop in said selected music work with said replacement loop;

(5) continuing to perform steps (1) through (4) until each of said plurality of music loops has been selected as said target music loop;

(d) after each music loop in said selected music work has been replaced, storing said replacement music work; and (e) performing steps (c) and (d) until a number of replacement works that have been stored is at least equal to said specified number of music work variants.

\* \* \* \* \*